(12) United States Patent
Anegawa

(10) Patent No.: US 11,602,877 B2
(45) Date of Patent: Mar. 14, 2023

(54) METHOD FOR MANUFACTURING MOLD AND MOLD

(71) Applicant: SEIKO EPSON CORPORATION, Tokyo (JP)

(72) Inventor: Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/445,771

(22) Filed: Aug. 24, 2021

(65) Prior Publication Data
US 2022/0063143 A1 Mar. 3, 2022

(30) Foreign Application Priority Data
Aug. 27, 2020 (JP) .............................. JP2020-143302

(51) Int. Cl.
*B29C 33/38* (2006.01)
*B29C 64/106* (2017.01)
*B33Y 40/20* (2020.01)
*B29C 64/30* (2017.01)
*B29C 64/245* (2017.01)

(52) U.S. Cl.
CPC ...... *B29C 33/3842* (2013.01); *B29C 33/3807* (2013.01); *B29C 64/106* (2017.08); *B29C 64/30* (2017.08); *B33Y 40/20* (2020.01); *B29C 2033/385* (2013.01)

(58) Field of Classification Search
CPC ........................ B29C 45/2673; B29C 45/2675
See application file for complete search history.

(56) References Cited

U.S. PATENT DOCUMENTS

| | | | | |
|---|---|---|---|---|
| 9,156,194 B2* | 10/2015 | Ng | ......................... | B29C 33/448 |
| 11,331,859 B2* | 5/2022 | Watanabe | ............... | B33Y 40/00 |
| 11,465,347 B2* | 10/2022 | Sasagawa | ............... | B22F 3/225 |
| 2014/0339395 A1* | 11/2014 | Kumpf | .................... | B29C 33/38 |
| | | | | 249/177 |
| 2019/0248069 A1* | 8/2019 | Anegawa | ............... | B29C 64/118 |
| 2021/0252746 A1* | 8/2021 | Lee | ........................... | B29C 33/38 |
| 2022/0176620 A1* | 6/2022 | Anegawa | ................ | B22F 1/108 |

FOREIGN PATENT DOCUMENTS

| | | | | |
|---|---|---|---|---|
| FR | 2753117 A1 * | 3/1998 | ............ | B23P 15/246 |
| JP | 2017-124593 A | 7/2017 | | |
| JP | 2021062587 A * | 4/2021 | ............ | B29C 45/03 |
| WO | WO-2018222481 A1 * | 12/2018 | | |

* cited by examiner

*Primary Examiner* — Atul P. Khare
(74) *Attorney, Agent, or Firm* — Workman Nydegger

(57) ABSTRACT

Provided is a method for manufacturing a mold used in an injection molding device. The manufacturing method includes: a first step of shaping a stacked body as a part of the mold by discharging a shaping material to stack layers on a base plate; and a second step of manufacturing the mold including a mold base, the base plate, and the stacked body by incorporating the base plate on which the stacked body is shaped inside an opening provided in the mold base.

9 Claims, 14 Drawing Sheets

METHOD FOR MANUFACTURING MOLD AND MOLD

The present application is based on, and claims priority from JP Application Serial Number 2020-143302, filed Aug. 27, 2020, the disclosure of which is hereby incorporated by reference herein in its entirety.

BACKGROUND

1. Technical Field

The present disclosure relates to a method for manufacturing a mold and a mold.

2. Related Art

JP-A-2017-124593 discloses that regarding to a mold used in an injection molding device, a stacked body having a tunnel gate is shaped using a three-dimensional shaping device, and the stacked body is attached to a mold such as a metal mold.

When the stacked body shaped by the three-dimensional shaping device is to be attached to the mold, accurate processing may be performed on an attachment surface of the stacked body to the mold in order to improve a quality of a molded object. However, since the processing on the attachment surface is troublesome work, there is a demand for a technique capable of more easily producing a mold including a stacked body.

SUMMARY

According to a first aspect of the present disclosure, a method for manufacturing a mold used in an injection molding device is provided. The manufacturing method includes: a first step of shaping a stacked body as a part of the mold by discharging a shaping material to stack layers on a base plate; and a second step of manufacturing the mold including a mold base, the base plate, and the stacked body by incorporating the base plate on which the stacked body is shaped inside an opening provided in the mold base.

According to a second aspect of the present disclosure, a mold configured to be used in an injection molding device is provided. The mold includes: a mold base having an opening; a base plate disposed inside the opening of the mold base; and a stacked body shaped on the base plate.

DESCRIPTION OF EXEMPLARY EMBODIMENTS

A. First Embodiment

Figure 1:
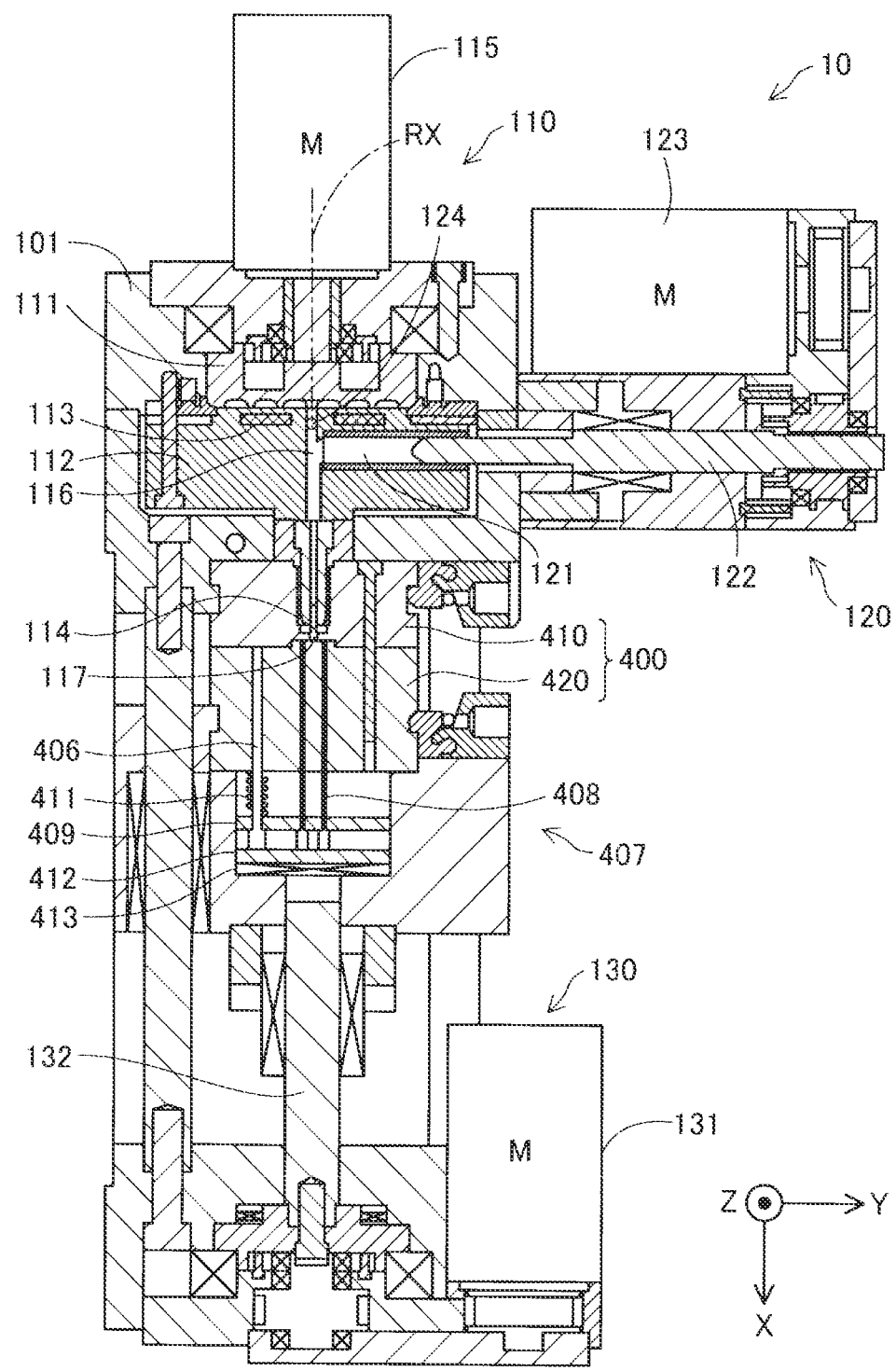
FIG. 1 is a cross-sectional view showing a schematic configuration of an injection molding device.

FIG. 1 is a cross-sectional view showing a schematic configuration of an injection molding device 10 in which a mold 400 according to the present embodiment is used. FIG. 1 shows arrows indicating X, Y, and Z directions orthogonal to each other. The X direction and the Y direction are directions parallel to a horizontal plane, and the Z direction is a direction opposite to a gravity direction. The X, Y, and Z directions shown in FIG. 2 and subsequent figures correspond to the X, Y, and Z directions shown in FIG. 1. In the following description, when a direction is to be specified, "+" indicates a positive direction as a direction indicated by the arrow, "−" indicates a negative direction as a direction opposite to the direction indicated by the arrow, and the positive and negative symbols are used together to indicate the directions.

The injection molding device 10 includes a plasticizing device 110, an injection control mechanism 120, a mold clamping device 130, and the mold 400.

The plasticizing device 110 includes a first flat screw 111, a first barrel 112, a first heater 113, and a first nozzle 114. The first flat screw 111 is housed in a housing portion 101. The first flat screw 111 is also called a scroll or a rotor. The first flat screw 111 is rotationally driven in the housing portion 101 around a rotation axis RX by a screw driving unit 115 including a driving motor or a speed reducer. In the present embodiment, the X direction is a direction along the rotation axis RX. An outflow hole 116 is formed in a center of the first barrel 112. An injection cylinder 121 to be described later is coupled to the outflow hole 116. The outflow hole 116 is provided with a check valve 124 upstream of the injection cylinder 121.

Figure 2:
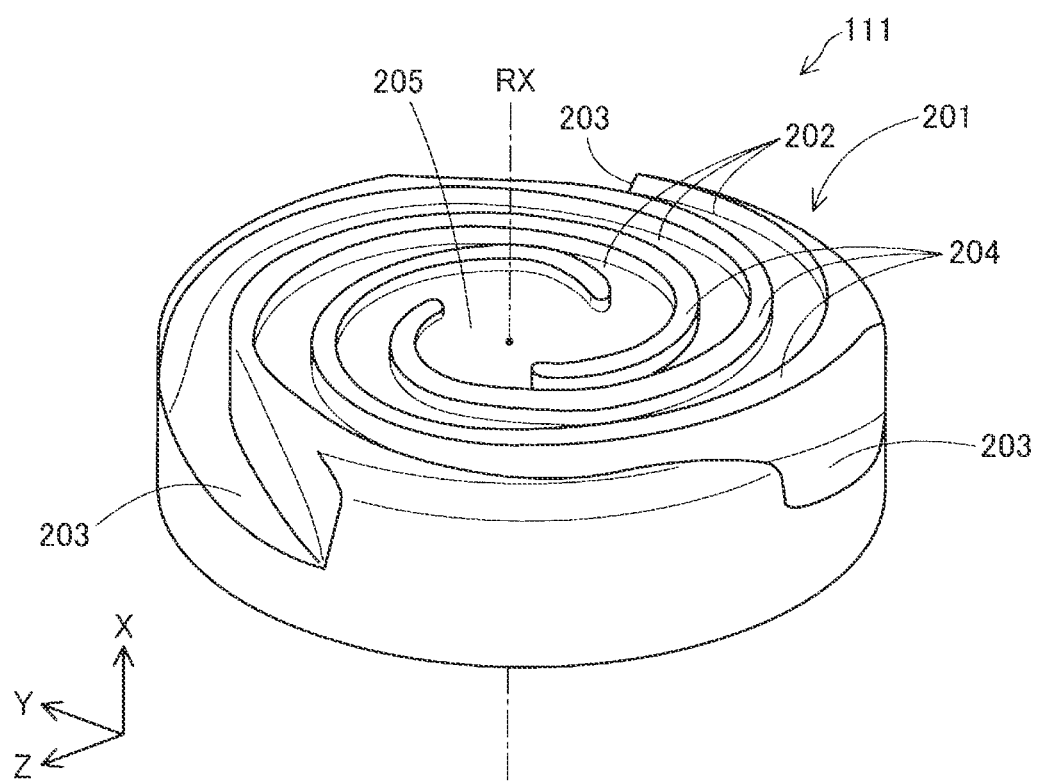
FIG. 2 is a perspective view showing a schematic configuration of a flat screw.

FIG. 2 is a perspective view showing a schematic configuration of the first flat screw 111. The first flat screw 111 has a substantially cylindrical shape in which a height in a direction along a central axis thereof is smaller than a diameter. In a groove forming surface 201 of the first flat screw 111 facing the first barrel 112, spiral grooves 202 are formed around a central portion 205. The grooves 202 communicate with material inlet ports 203 formed in a side surface of the first flat screw 111. A material supplied from a material supply unit such as a hopper is supplied to the grooves 202 through the material inlet ports 203. The grooves 202 are formed by being separated by ridge portions 204. FIG. 2 shows an example in which three grooves 202 are formed, whereas the number of the grooves 202 may be one or two or more. A shape of the grooves 202 is not limited to a spiral shape, and may be a helical shape or an involute curve shape, or may be a shape extending so as to draw an arc from the central portion toward an outer periphery.

Figure 3:
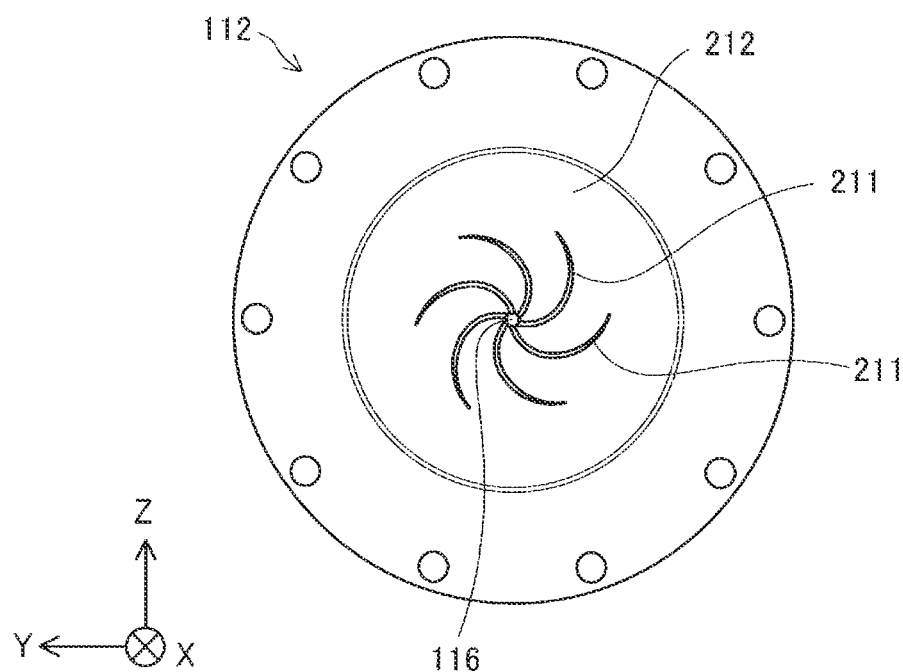
FIG. 3 is a schematic plan view of a barrel.

FIG. 3 is a schematic plan view of the first barrel 112. The first barrel 112 has a facing surface 212 facing the groove forming surface 201 of the first flat screw 111. The outflow hole 116 is formed in a center of the facing surface 212. A plurality of guide grooves 211 coupled to the outflow hole 116 and extending in a spiral shape from the outflow hole 116 toward the outer periphery are formed in the facing surface 212. The material supplied to the grooves 202 of the first flat screw 111 is plasticized between the first flat screw 111 and the first barrel 112 by the rotation of the first flat screw 111 and heating of the first heater 113, flows along the grooves 202 and the guide grooves 211 by the rotation of the first flat screw 111, and is guided to the central portion 205 of the first flat screw 111. The material flowing into the central portion 205 is guided to the injection control mechanism 120 from the outflow hole 116 provided in the center of the first barrel 112. The guide grooves 211 may not be provided in the first barrel 112.

In the present embodiment, the "plasticization" means that heat is applied to a thermoplastic material to melt the material. Further, the term "melt" means not only that the thermoplastic material is heated to a temperature equal to or higher than a melting point to be liquefied, but also that the thermoplastic material is heated to a temperature equal to or higher than a glass transition point to be softened, thereby exhibiting fluidity.

As shown in FIG. 1, the injection control mechanism 120 includes the injection cylinder 121, a plunger 122, and a plunger driving unit 123. The injection control mechanism 120 has a function of injecting a plasticizing material in the injection cylinder 121 into a cavity 117 to be described later. The injection control mechanism 120 controls an injection amount of the plasticizing material from the first nozzle 114. The injection cylinder 121 is a substantially cylindrical member coupled to the outflow hole 116 of the first barrel 112, and includes the plunger 122 therein. The plunger 122 slides inside the injection cylinder 121 and pumps the plasticizing material in the injection cylinder 121 to the first nozzle 114 included in the plasticizing device 110. The plunger 122 is driven by the plunger driving unit 123 configured with a motor.

The mold 400 includes a movable mold 420 and a fixed mold 410. The movable mold 420 and the fixed mold 410 are provided so as to face each other, and the cavity 117 corresponding to a shape of a molded object is provided therebetween. The movable mold 420 and the fixed mold 410 are formed with concave and convex shapes defining the cavity 117. The concave shape defining the cavity 117 is also referred to as a cavity portion, and the convex shape is also referred to as a core portion. In the cavity 117, the plasticizing material flowing out from the outflow hole 116 of the first barrel 112 is pumped by the injection control mechanism 120 and injected from the first nozzle 114. Details of the movable mold 420 and the fixed mold 410 will be described later, and the movable mold 420 and the fixed mold 410 according to the present embodiment are resin molds each including a stacked body in which the cavity 117 is formed, a base plate, and a mold base.

The mold clamping device 130 includes a mold driving unit 131, and has a function of opening and closing the movable mold 420 and the fixed mold 410. The mold clamping device 130 rotates a ball screw 132 by driving the mold driving unit 131 configured with a motor, and moves the movable mold 420 coupled to the ball screw 132 with respect to the fixed mold 410 to open and close the mold 400. That is, the fixed mold 410 is stationary in the injection molding device 10, and the movable mold 420 moves relative to the stationary fixed mold 410 to open and close the mold 400.

The movable mold 420 is provided with an extrusion mechanism 407 for demolding the molded object from the mold 400. The extrusion mechanism 407 includes an ejector pin 408, a support plate 409, a support rod 406, a spring 411, an extrusion plate 412, and a thrust bearing 413.

The ejector pin 408 is a rod-shaped member for extruding the molded object molded in the cavity 117. The ejector pin 408 passes through the movable mold 420 and is inserted into the cavity 117. The support plate 409 is a plate member that supports the ejector pin 408. The ejector pin 408 is fixed to the support plate 409. The support rod 406 is fixed to the support plate 409, and is inserted into a through hole formed in the movable mold 420. The spring 411 is disposed in a space between the movable mold 420 and the support plate 409, and is inserted by the support rod 406. The spring 411 biases the support plate 409 such that a head portion of the ejector pin 408 forms a part of a wall surface of the cavity 117 at a time of molding. The extrusion plate 412 is fixed to the support plate 409. The thrust bearing 413 is attached to the extrusion plate 412 and is provided such that a head portion of the ball screw 132 does not damage the extrusion plate 412. A thrust sliding bearing and the like may be used instead of the thrust bearing 413.

Figure 4:
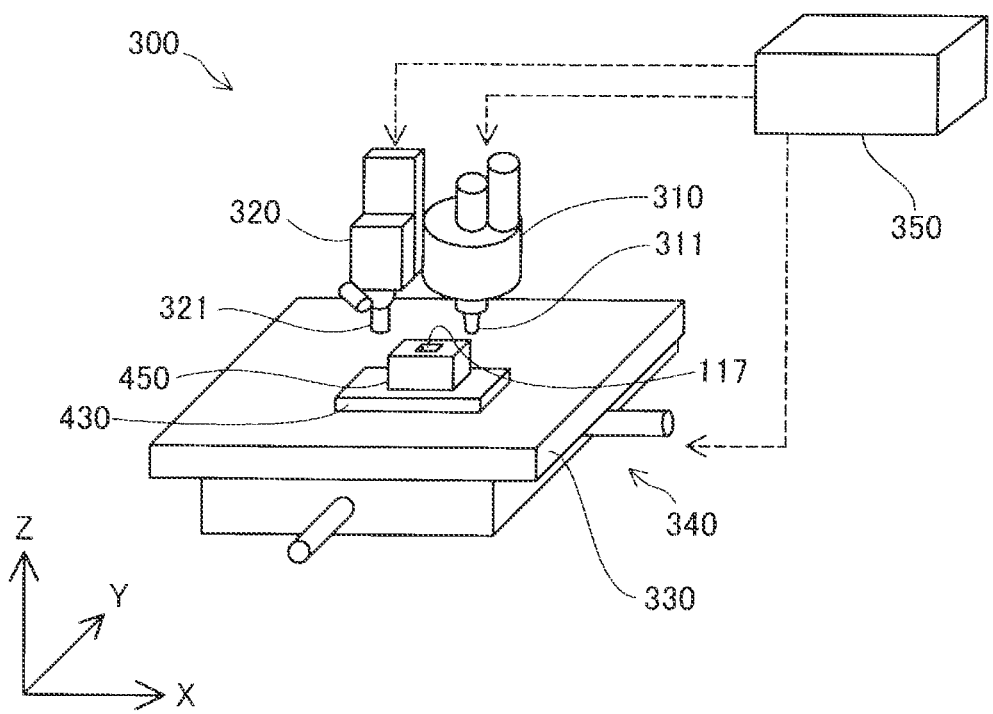
FIG. 4 is an explanatory diagram showing a schematic configuration of a three-dimensional shaping device.

FIG. 4 is an explanatory diagram showing a schematic configuration of a three-dimensional shaping device 300. The three-dimensional shaping device 300 according to the present embodiment shapes a stacked body 450 as a part of the mold 400 used in the injection molding device 10 by stacking layers. The stacked body 450 is also referred to as a shaped component.

The three-dimensional shaping device 300 according to the present embodiment includes a shaping unit 310, a cutting unit 320, a stage 330, a moving mechanism 340, and a controlling unit 350.

The controlling unit 350 is configured with a computer including one or a plurality of processors, a main storage device, and an input and output interface for inputting and outputting signals to and from an outside. The controlling unit 350 controls operations of the shaping unit 310, the cutting unit 320, and the moving mechanism 340 by the processor executing a program or a command read into the main storage device. The controlling unit 350 may be configured not with the computer but with a combination of a plurality of circuits.

The three-dimensional shaping device 300 drives the moving mechanism 340 to change a relative position between a second nozzle 311 provided at the shaping unit 310 and the stage 330 while discharging the shaping material toward the stage 330 from the second nozzle 311 under the control of the controlling unit 350, thereby shaping the stacked body 450 on the stage 330.

Further, the three-dimensional shaping device 300 drives the moving mechanism 340 to change a relative position between a cutting tool 321 mounted at the cutting unit 320 and the stage 330 while rotating the cutting tool 321 under the control of the controlling unit 350, thereby cutting the stacked body 450 stacked on the stage 330 with the cutting tool 321 to form the cavity 117.

Figure 5:
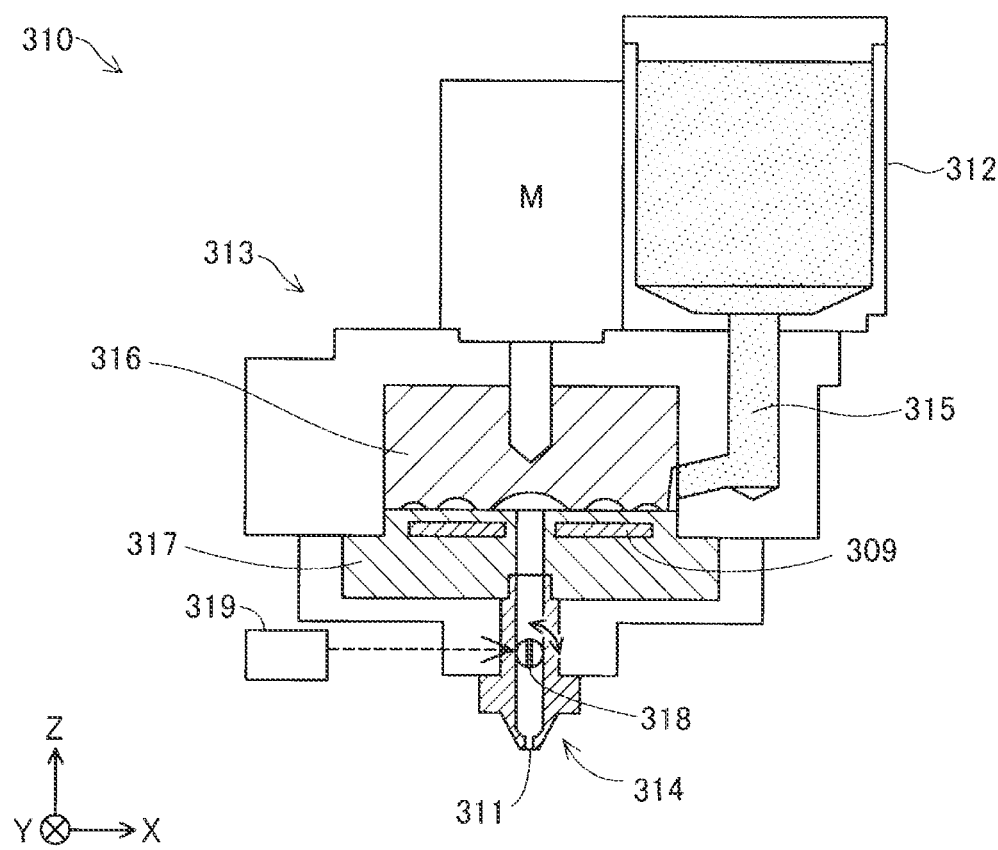
FIG. 5 is an explanatory diagram showing a schematic configuration of a shaping unit.

FIG. 5 is an explanatory diagram showing a schematic configuration of the shaping unit 310. The shaping unit 310 includes a material supply unit 312 as a supply source of the material, a plasticizing unit 313 which plasticizes the material to form the shaping material, and a discharge unit 314 which discharges the shaping material.

The material supply unit 312 supplies a raw material for generating the shaping material to the plasticizing unit 313. The material supply unit 312 is configured with, for example, a hopper in which the raw material is housed. The material supply unit 312 is coupled to the plasticizing unit 313 via a material supply path 315 coupled under the material supply unit 312. The raw material is put into the material supply unit 312 in a form of pellets, powders, and the like. As the raw material, for example, a material including a resin as a main component, such as a cyclic olefin copolymer (COC), acrylonitrile butadiene styrene (ABS), polyacetal (POM), polyamide (PA) 66, polyphenylene sulfide (PPS), polyether ether ketone (PEEK), and polybenzimidazole (PBI), is used. The term "main component" refers to a component contained in a largest amount in terms of a mass, for example, 50 mass % or more in the material. The raw material may contain a component such as metal or ceramic, a solvent, and a binder in addition to the main component.

The plasticizing unit 313 is a device including a similar configuration as the plasticizing device 110 of the injection molding device 10 shown in FIG. 1. That is, the plasticizing unit 313 plasticizes the raw material by a second flat screw 316, a second barrel 317, and a second heater 309. The plasticizing unit 313 plasticizes the raw material supplied from the material supply unit 312 to generate a paste-like shaping material exhibiting fluidity, and guides the shaping material to the discharge unit 314.

The discharge unit 314 includes the second nozzle 311 which discharges the shaping material generated by the plasticizing unit 313 toward the stage 330. The discharge unit 314 is provided with a discharge amount adjusting unit 318 capable of adjusting a discharge amount of the shaping material discharged from the second nozzle 311. In the present embodiment, the discharge amount adjusting unit 318 is configured with a butterfly valve. The controlling unit 350 adjusts the discharge amount of the shaping material by driving a valve driving unit 319 configured with a motor and the like to rotate the butterfly valve.

The cutting unit 320 shown in FIG. 4 is a device which rotates the cutting tool 321 attached to a distal end on a stage 330 side to cut the stacked body 450 stacked on the stage 330. As the cutting tool 321, for example, a flat end mill or a ball end mill can be used. By controlling the moving mechanism 340, the controlling unit 350 controls a cutting position by changing a relative position between the cutting tool 321 and the stacked body 450 stacked on the stage 330.

The stage 330 is supported by the moving mechanism 400. The moving mechanism 340 according to the present embodiment is configured as a three-axis positioner which moves the stage 330 with respect to the shaping unit 310 and the cutting unit 320 along the X, Y, and Z directions. In the present embodiment, a base plate 430 constituting a part of the mold 400 is detachably fixed on the stage 330, and the stacked body 450 is shaped on the base plate 430. The moving mechanism 340 may move the shaping unit 310 and the cutting unit 320 with respect to the stage 330 without moving the stage 330. Further, the moving mechanism 340 may move the stage 330 together with the shaping unit 310 and the cutting unit 320. The moving mechanism 340 may have a function of tilting the stage 330 with respect to the horizontal plane, or may have a function of tilting the second nozzle 311 or the cutting tool 321.

Figure 6:
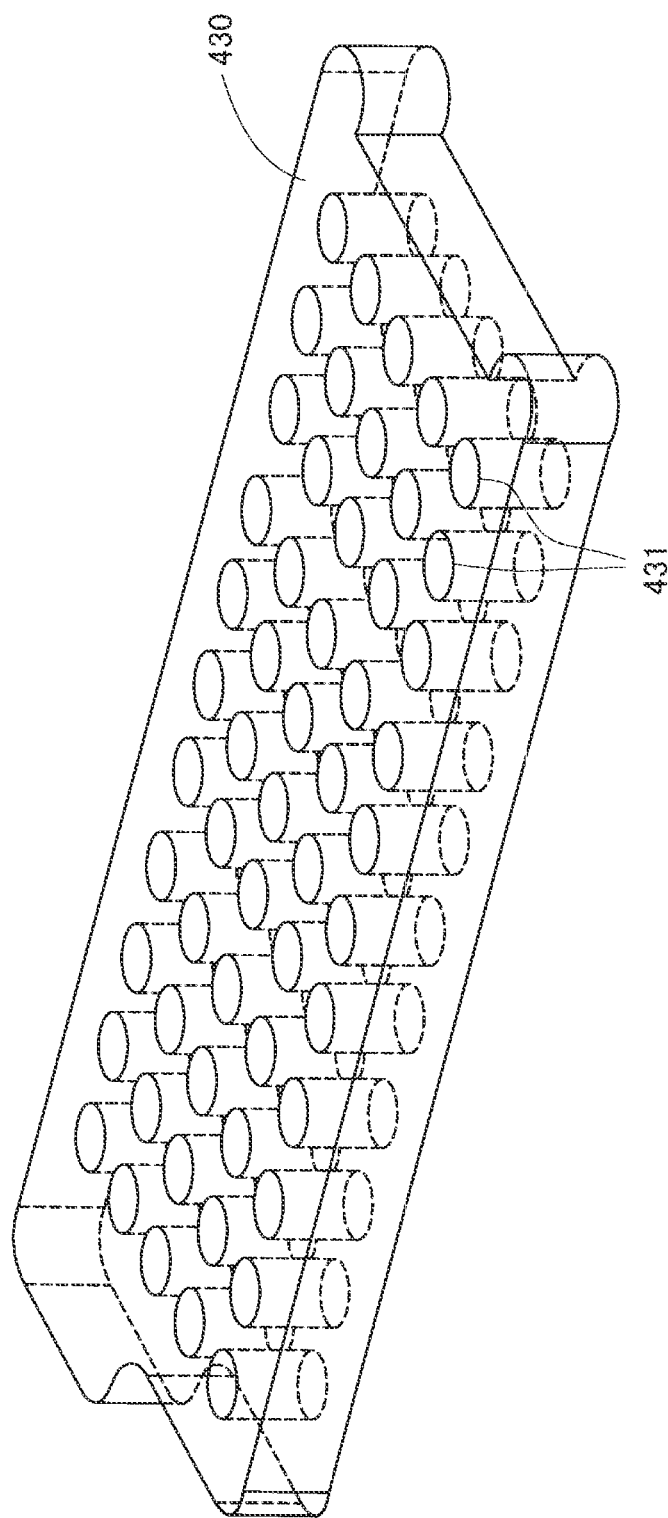
FIG. 6 is a perspective view showing a schematic configuration of a base plate.

FIG. 6 is a perspective view showing a schematic configuration of the base plate 430. The base plate 430 is a plate-shaped metal member. The base plate 430 is formed with a plurality of through holes 431 in a surface on which the layers are stacked. The plurality of through holes 431 are arranged in a matrix. The base plate 430 is not limited to metal, and may be formed of a material such as glass or ceramic.

Figure 7:
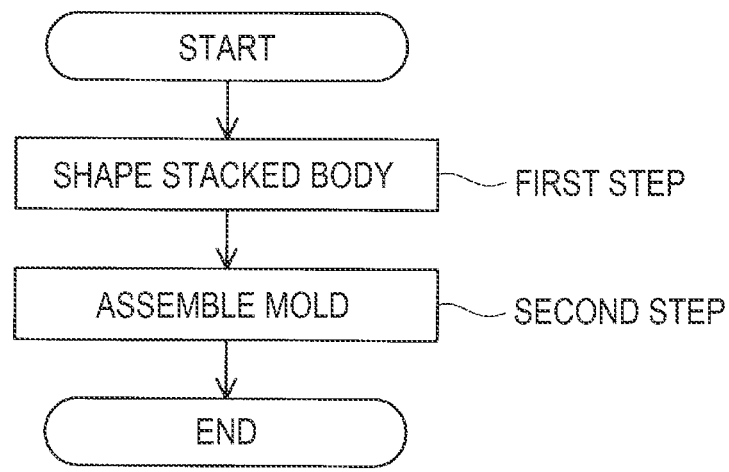
FIG. 7 is a process diagram showing a method for manufacturing a mold.

FIG. 7 is a process diagram showing a method for manufacturing the mold 400. Hereinafter, a method for manufacturing the movable mold 420 of the mold 400 will be described. In a first step, first, the three-dimensional shaping device 300 shapes the stacked body 450 as a part of the mold 400 on the base plate 430 fixed on the stage 330.

Figure 8:
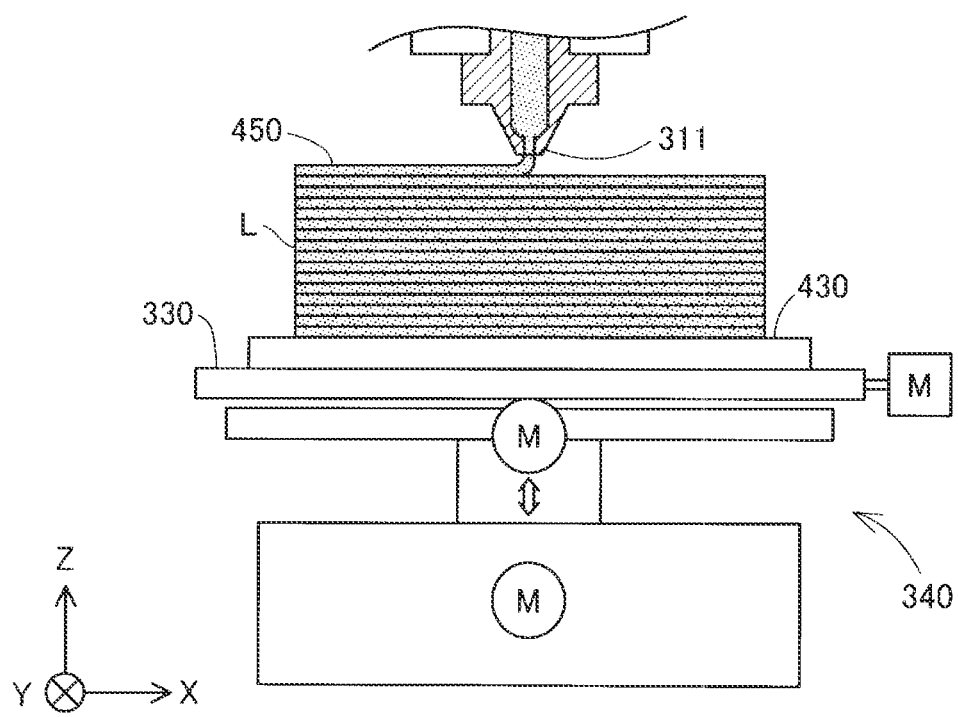
FIG. 8 is a diagram schematically showing a state in which a stacked body is shaped in the three-dimensional shaping device.

FIG. 8 is a diagram schematically showing a state in which the stacked body 450 is shaped in the three-dimensional shaping device 300. In the three-dimensional shaping device 300, the plasticizing unit 313 of the shaping unit 310 plasticizes the raw material in a solid state to generate the shaping material. The controlling unit 350 changes a position of the second nozzle 311 with respect to the stage 330 in a direction along an upper surface of the stage 330 while maintaining a distance between the stage 330 and the second nozzle 311, and discharges the shaping material from the second nozzle 311. The shaping material discharged from the second nozzle 311 is continuously stacked on the base plate 430 in a moving direction of the second nozzle 311 to form a layer L.

The controlling unit 350 repeats traversal of the second nozzle 311 to form a plurality of layers L. More specifically, the controlling unit 350 moves a position of the second nozzle 311 with respect to the stage 330 in the Z direction after one layer L is formed. Then, the stacked body 450 is shaped by further stacking layers L on the layers L formed so far.

The controlling unit 350 may temporarily interrupt the discharge of the shaping material from the second nozzle 311 when moving the second nozzle 311 in the Z direction after one layer L is stacked or when shaping a discontinuous path. In this case, the controlling unit 350 controls the discharge amount adjusting unit 318 to stop the discharge of the shaping material from the second nozzle 311. After changing the position of the second nozzle 311, the controlling unit 350 restarts the discharge of the shaping material by the discharge amount adjusting unit 318, thereby restarting the stacking of the shaping material from the changed position of the second nozzle 311.

Figure 9:
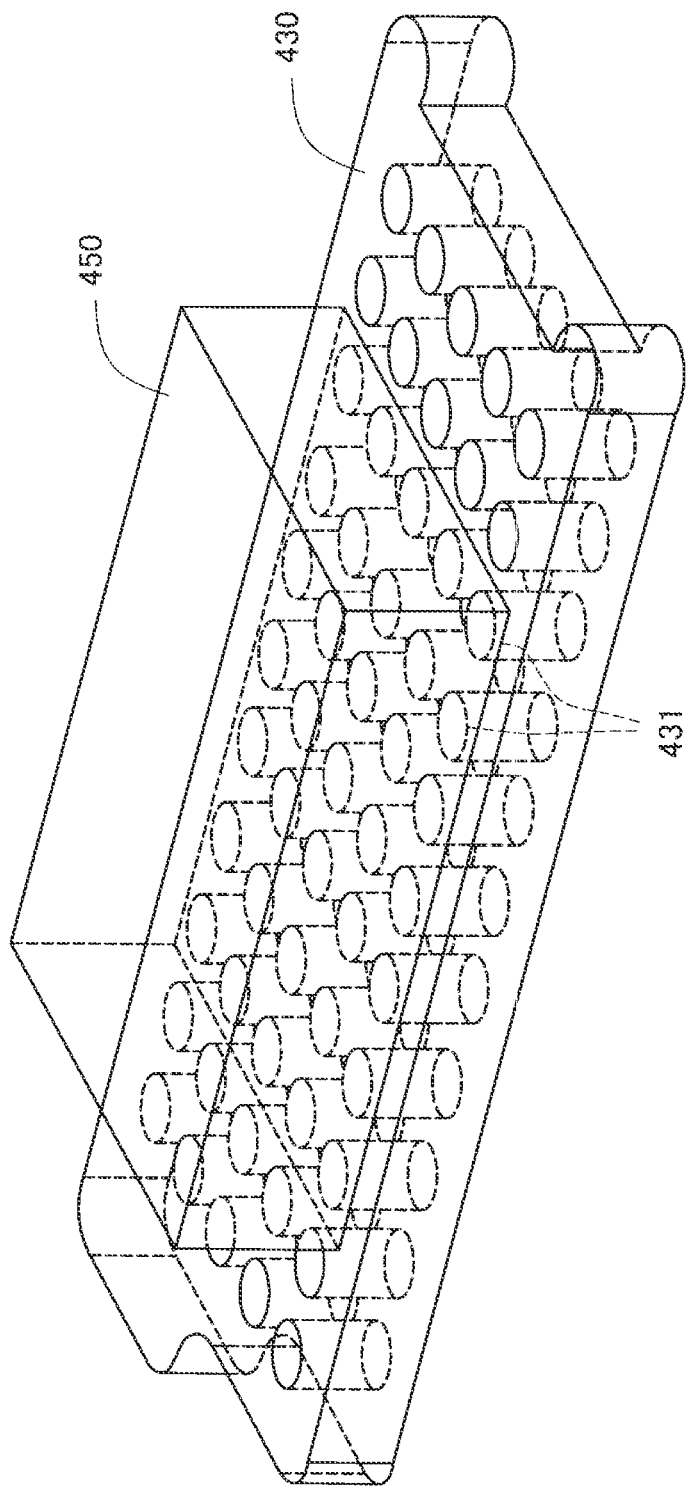
FIG. 9 is a perspective view showing a state in which the stacked body is shaped on the base plate.

FIG. 9 is a perspective view showing a state in which the stacked body 450 is shaped on the base plate 430. The base plate 430 is formed with the plurality of through holes 431 in the surface on which the layers L are stacked. Therefore, the second nozzle 311 moves and discharges the shaping material so as to straddle the through holes 431, so that a part of the shaping material enters the through holes 431 and the through holes 431 exert an anchor effect. Therefore, it is possible to prevent peeling of the stacked body 450 from the base plate 430 during the shaping of the stacked body 450.

Figure 10:
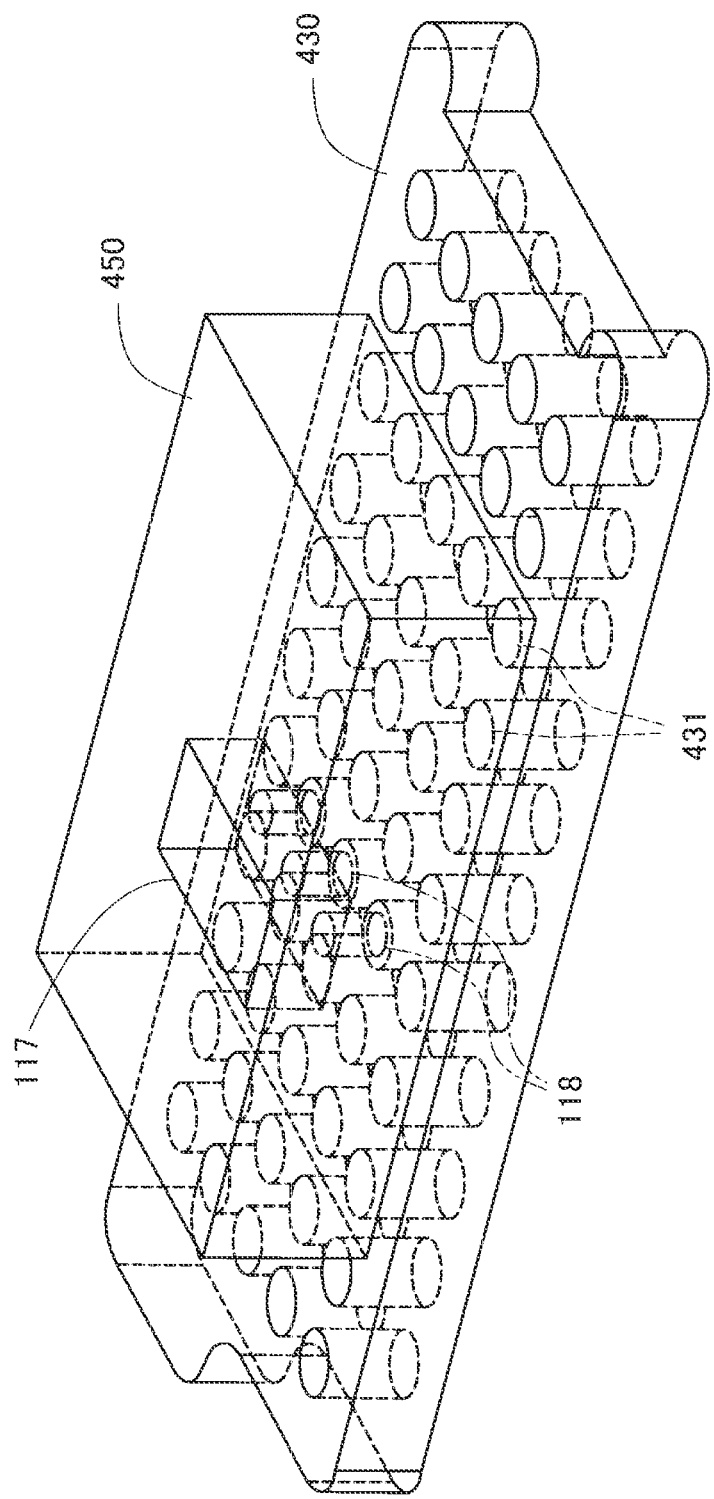
FIG. 10 is a perspective view showing a state in which cutting processing is performed on the stacked body.

FIG. 10 is a perspective view showing a state in which cutting processing is performed on the stacked body 450. In the present embodiment, in the first step shown in FIG. 7, after the stacked body 450 is shaped, the three-dimensional shaping device 300 forms the cavity 117 by cutting the stacked body 450 using the cutting unit 320. That is, in the first step, the stacked body 450 having the cavity 117 is shaped. FIG. 10 shows the example in which the concave shape defining the cavity 117 is formed, and the convex shape defining the cavity 117 may be formed by the cutting. FIG. 10 shows the example in which only one cavity 117 is formed, and a plurality of cavities 117 may be formed. In other embodiments, not only the cavity 117 may be formed, but also a surface of the stacked body 450 may be smoothed or a side surface of the stacked body 450 may be shaved using the cutting unit 320.

In the present embodiment, the three-dimensional shaping device 300 further performs hole-forming processing on a bottom portion of the cavity 117 using the cutting unit 320 to form communication holes 118 communicating with at least one through hole 431 of the plurality of through holes 431 in the stacked body 450. That is, in the first step, the stacked body 450 is shaped in which the communication holes 118 which communicate at least one through hole 431 of the plurality of through holes 431 with the cavity 117 formed in the stacked body 450 are formed. FIG. 10 shows the example in which three communication holes 118 communicating with three through holes 431 are formed. When the mold 400 is attached to the injection molding device 10, the ejector pin 408 is inserted into the communication holes 118.

Figure 11:
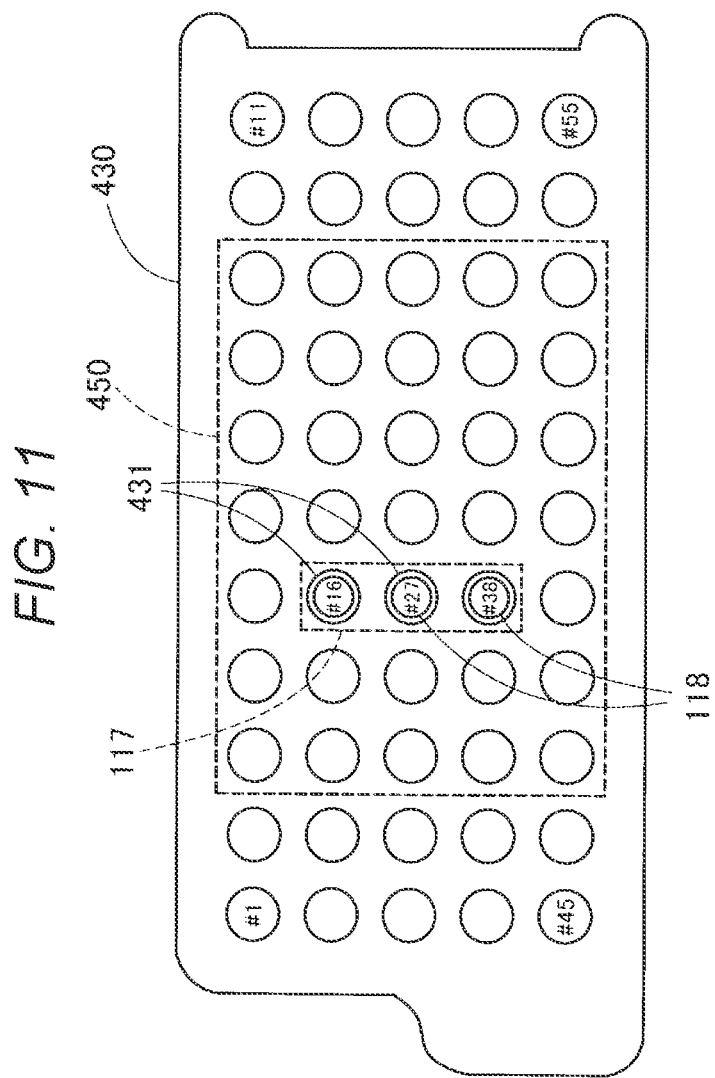
FIG. 11 is a view showing positions at which communication holes are formed, as viewed from a lower surface side of the base plate.

FIG. 11 is a view showing positions at which the communication holes 118 are formed, as viewed from a lower surface side of the base plate 430. In the present embodiment, since the through holes 431 are arranged in the matrix in the base plate 430, when a correspondence relationship between a position of each through hole 431 and an identification number for identifying the position of the through hole 431 is stored in the controlling unit 350, formation positions of the communication holes 118 into which the ejector pin 408 is inserted can be easily designated. FIG. 11 shows an example in which the identification numbers from No. 1 to No. 55 are assigned to the respective through holes 431, and the communication holes 118 are formed at positions corresponding to the through holes 431 of No. 16, No. 27, and No. 38.

In the second step shown in FIG. 7, the mold 400 is assembled using the stacked body 450 generated on the base plate 430 in the first step.

Figure 12:
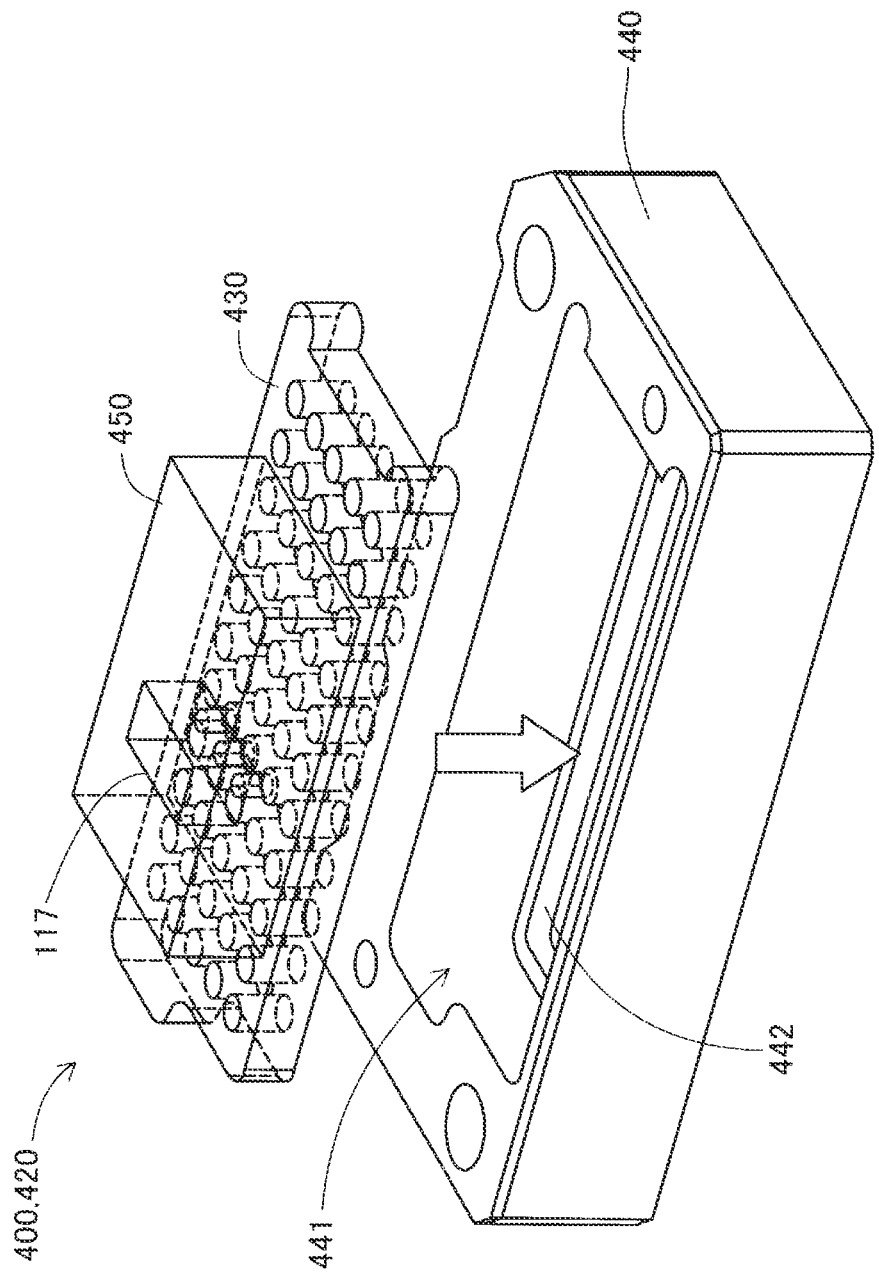
FIG. 12 is an explanatory diagram showing a method for assembling the mold.

FIG. 12 is an explanatory diagram showing a method for assembling the mold 400. In the present embodiment, a metal mold base 440 having an opening 441 is prepared, and the base plate 430 on which the stacked body 450 is shaped is fitted inside the opening 441 of the mold base 440. In this way, the mold 400 including the mold base 440, the base plate 430, and the stacked body 450 is assembled. A shape of the inside of the opening 441 is a shape in which the base plate 430 is fitted, that is, a shape exactly matching a shape of the base plate 430. At a bottom portion of the opening 441 of the mold base 440, a convex portion 442 with which the base plate 430 abuts from above is provided toward the inside, and a portion on the inside of the convex portion 442 is opened. That is, it can be said that the opening 441 is a through hole, and it can also be said that the opening 441 is a concave portion through which a part of the bottom portion passes. The base plate 430 may be fixed to the mold base 440 in a state of being incorporated in the mold base 440. For example, bolt holes are provided in a side surface of the mold base 440 and a side surface of the base plate 430, and the base plate 430 can be fixed to the mold base 440 by screwing bolts into the bolt holes.

As described above, the method for manufacturing the movable mold 420 is described, and the fixed mold 410 can also be manufactured in a similar manner. However, for the fixed mold 410, instead of the communication holes 118 through which the ejector pin 408 passes, a gate portion through which the plasticizing material injected from the first nozzle 114 is guided to the cavity 117 is formed in the stacked body 450 by the shaping unit 310 or the cutting unit 320. Further, the first nozzle 114 provided in the injection molding device 10 is inserted into any one of the through holes 431 of the base plate 430.

The mold 400 manufactured as described above is attached to the injection molding device 10 shown in FIG. 1, and is used for injection molding. A raw material used in the injection molding may be a resin material having lower heat resistance than the material of the stacked body 450. The low heat resistance means that the glass transition point or the melting point is low. For example, when the material of the stacked body 450 is PBI, PEEK, PPS, POM, and ABS can be used as the material used for the injection molding. When the material of the stacked body 450 is PEEK, PPS, POM, and ABS can be used as the material used for the injection molding. Further, when the material of the stacked body 450 is PPS, POM and ABS can be used as the material used for the injection molding.

According to the first embodiment described above, the shaping material is directly discharged onto the base plate 430 to shape the stacked body 450, and the stacked body 450 is incorporated into the inside of the opening 441 provided in the mold base 440 together with the base plate 430 to manufacture the mold 400. When the stacked body 450 is separately produced and fixed to the base plate 430 or the mold base 440, it is necessary to process the attachment surface of the stacked body 450 to the base plate 430 or the mold base 440 with high accuracy. In the present embodiment, as described above, since the stacked body 450 is directly shaped on the base plate 430, it is not necessary to process the attachment surface. Therefore, the mold 400 including the stacked body 450 can be easily manufactured.

After the stacked body 450 is used, the base plate 430 can be reused by removing the stacked body 450 from the base plate 430.

In the present embodiment, the cavity 117 is formed by cutting the stacked body 450 after the stacked body 450 is shaped by stacking the layers L, and therefore the cavity 117 can be formed with high accuracy.

In the present embodiment, since the plurality of through holes 431 are formed in the base plate 430, it is possible to prevent the peeling of the stacked body 450 from the base plate 430 due to the anchor effect of the through holes 431.

In the present embodiment, the communication holes 118 which communicate at least one through hole 431 of the plurality of through holes 431 provided in the base plate 430 with the cavity 117 are formed in the stacked body 450. Therefore, the ejector pin 408 for demolding the molded object can be inserted into the cavity 117 through the through holes 431 and the communication holes 118. Further, since the through holes 431 into which the ejector pin 408 is inserted can be freely selected from among the plurality of through holes 431, versatility of the base plate 430 can be enhanced.

In the present embodiment, the shape of the base plate 430 is a shape which fits into the opening 441 of the mold base 440. Therefore, the stacked body 450 can be accurately positioned with respect to the mold base 440. Further, in the present embodiment, since the stacked body 450 is positioned in the mold base 440 by the base plate 430, the stacked body 450 does not need to be sized to fill the entire opening 441 and can be formed compactly. Therefore, the mold 400 can be manufactured in a short period of time.

Further, in the present embodiment, the stacked body 450 is shaped using the shaping material containing the resin as the main component. Therefore, by heat insulating effect of the resin, it is possible to prevent rapid cooling of the plasticizing material in the cavity 117 at the time of the injection molding. Therefore, it is possible to reduce occurrence of sink marks in the molded object.

B. Second Embodiment

Figure 13:
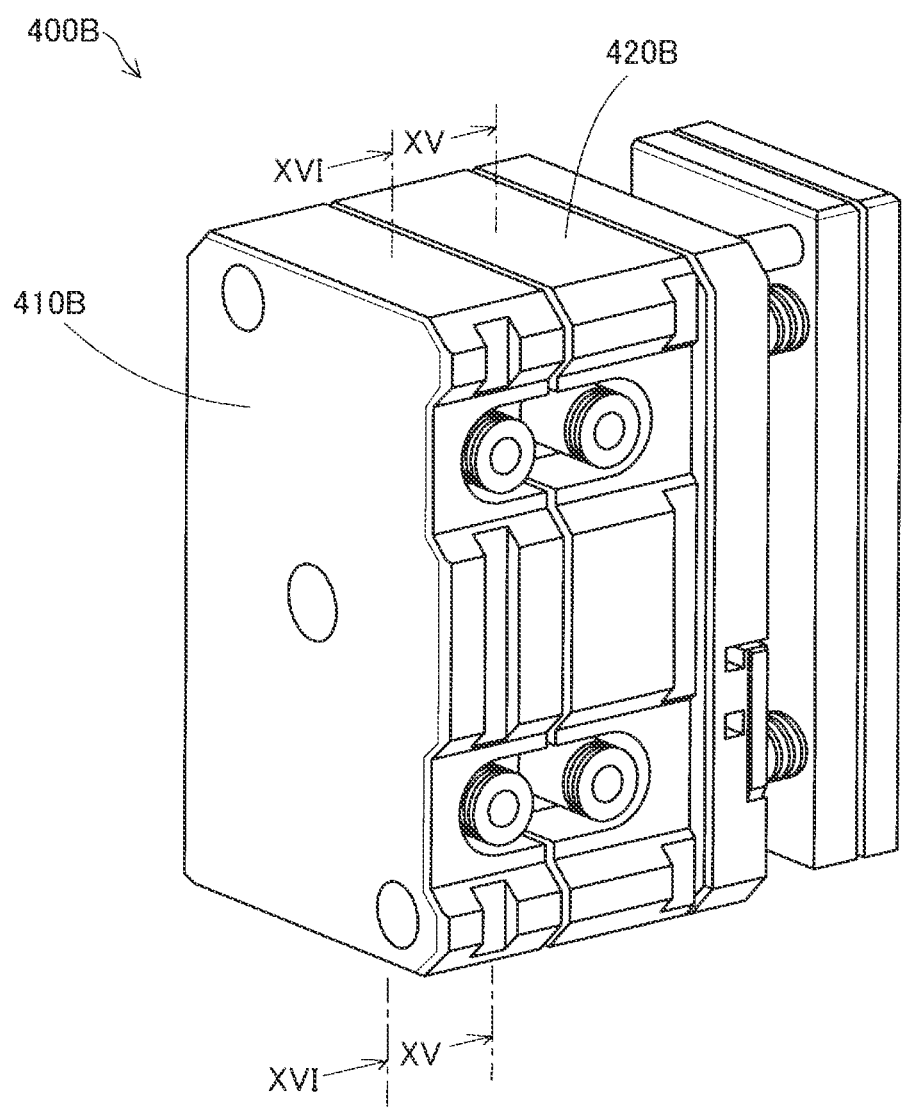
FIG. 13 is a perspective view of a mold according to a second embodiment.

FIG. 13 is a perspective view of a mold 400B according to a second embodiment. The mold 400B includes a fixed mold 410B and a movable mold 420B.

Figure 14:
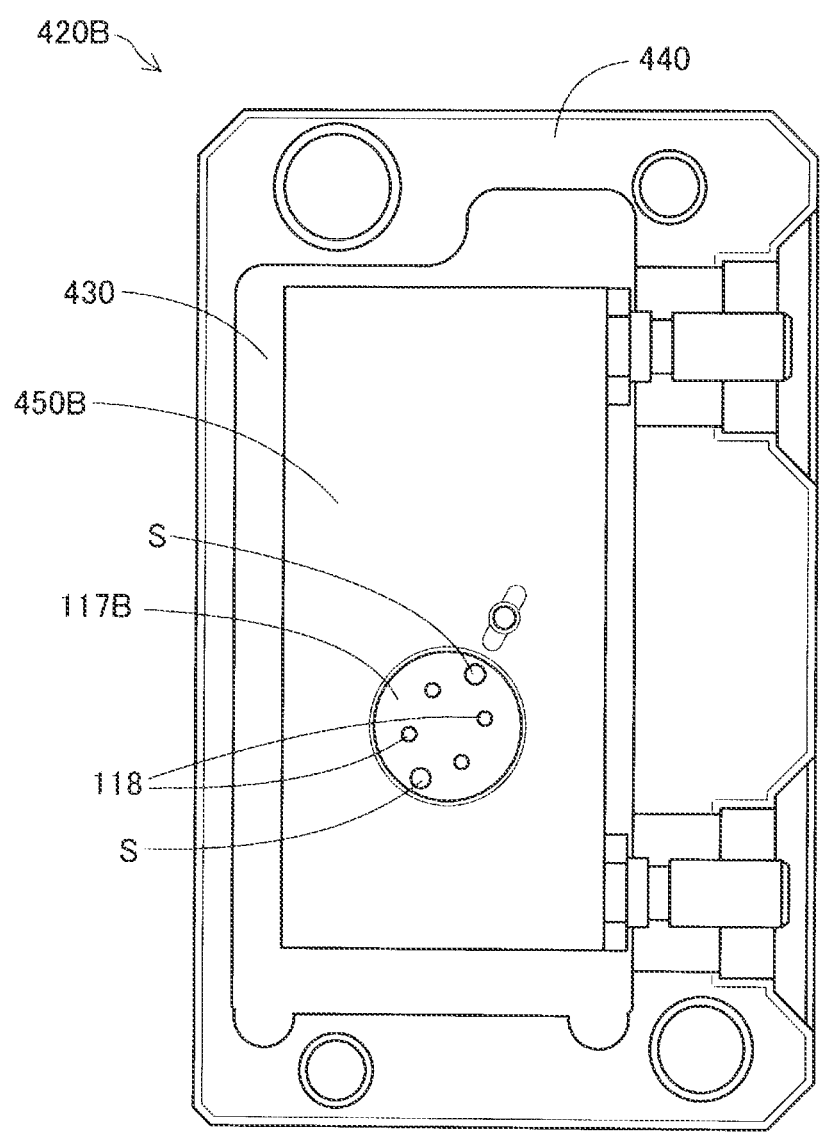
FIG. 14 is a plan view showing a parting surface of a movable mold.

FIG. 14 is a plan view showing a parting surface of the movable mold 420B. In the second embodiment, a space S in which a sensor can be attached is formed in a stacked body 450B so as to communicate with a cavity 117B formed in the stacked body 450B. As the sensor, for example, a sensor which measures a temperature and pressure of the resin in the cavity 117B is attached. The space S is formed by cutting in the first step of the method of manufacturing a mold shown in FIG. 7. That is, in a first step in the second embodiment, the stacked body 450B is shaped in which the space S in which the sensor can be attached is formed. The space S may be formed by stacking layers around the space S instead of the cutting. That is, the space S may be formed by three-dimensional shaping.

Figure 15:
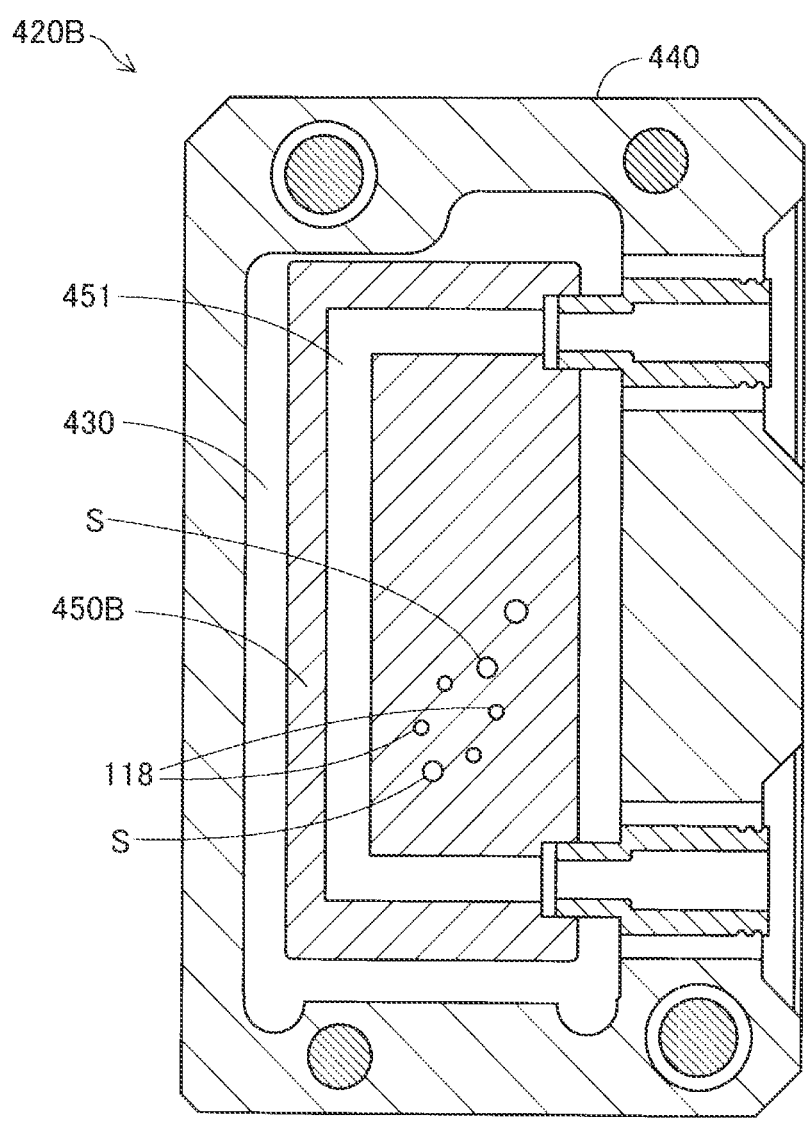
FIG. 15 is a cross-sectional view of the movable mold.

FIG. 15 is a cross-sectional view of the movable mold 420B. FIG. 15 shows a cross section taken along a line XV-XV in FIG. 13. In the present embodiment, a first flow path 451 through which a heat medium for cooling the cavity 117B flows is formed inside the stacked body 450B. The first flow path 451 is formed by the three-dimensional shaping using the shaping unit 310 in the first step of the method for manufacturing the mold showing in FIG. 7. That is, in the first step in the second embodiment, the stacked body 450B is shaped in which the flow path through which the heat medium flows is formed. The first flow path 451 may be formed by the cutting as long as it has a simple shape.

Figure 16:
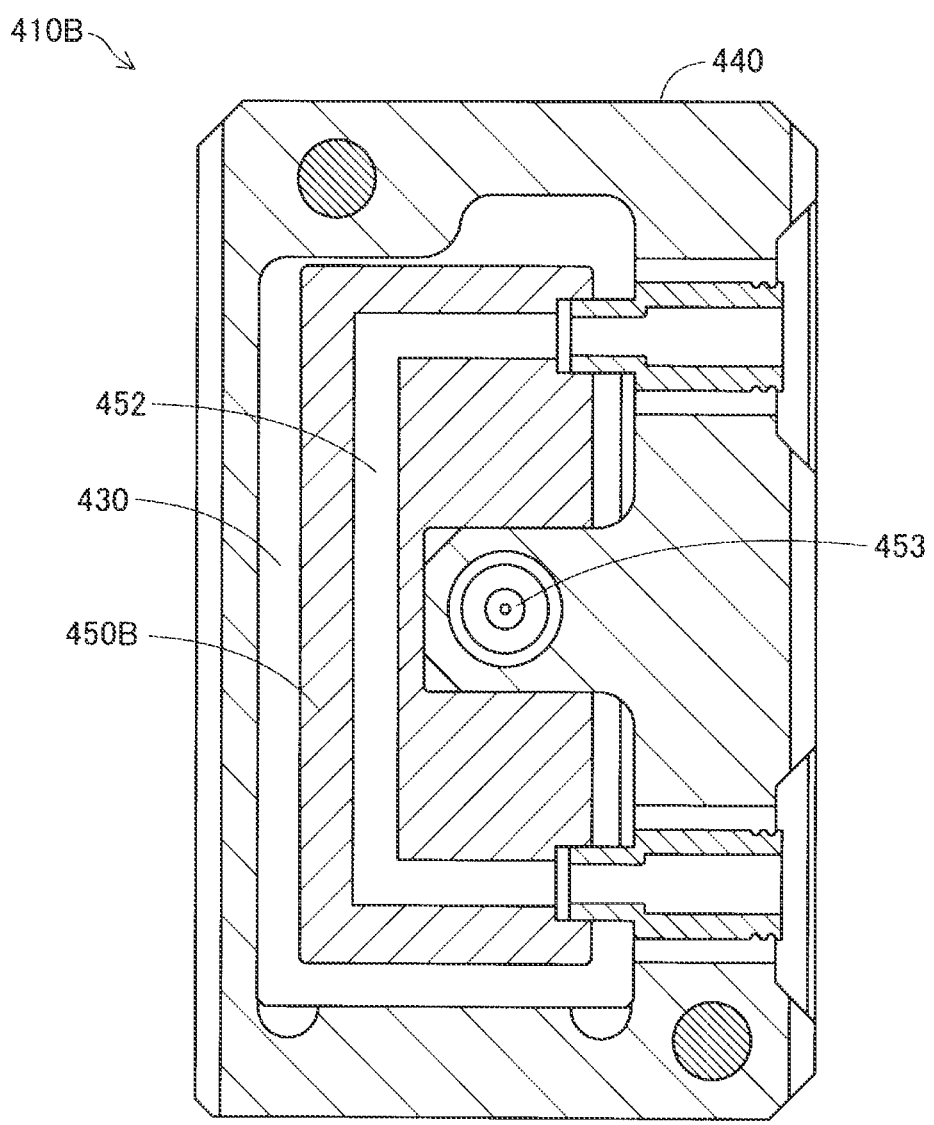
FIG. 16 is a cross-sectional view of a fixed mold.

FIG. 16 is a cross-sectional view of the fixed mold 410B. FIG. 16 shows a cross section taken along a line XVI-XVI in FIG. 13. In the present embodiment, a second flow path 452 through which the heat medium flows is also formed in the stacked body 450B provided in the fixed mold 410B. The mold 400B may be provided with only one of the first flow path 451 and the second flow path 452.

Further, the fixed mold 410B according to the present embodiment is provided with a metal gate portion 453. The gate portion 453 is fixed to the mold base 440. In a second step of the present embodiment, the base plate 430 on which the stacked body 450B is shaped is incorporated into the mold base 440 on which the metal gate portion 453 is provided. Therefore, injection of a plasticizing material into the cavity 117B is performed not through a gate portion shaped by a resin but through the metal gate portion 453.

According to the second embodiment described above, since the flow paths 451 and 452 through which the heat medium flows are formed in the stacked body 450B, the cavity 117B can be cooled more efficiently than when the flow paths 451 and 452 are disposed outside the stacked body 450B.

In the present embodiment, since the space S for attaching the sensor is formed in the stacked body 450B, a temperature and pressure inside the cavity 117B can be monitored using the sensor.

Further, in the present embodiment, since the gate portion 453 for performing injection into the cavity 117B is formed of metal instead of the resin, it is possible to prevent deformation of the gate portion 453 exposed to a high temperature and high pressure in the mold 400B.

In the second embodiment, (1) the flow paths 451 and 452 through which the heat medium flows, (2) the space S in which the sensor can be attached, and (3) the metal gate portion 453 may not be provided in the mold 400B together, as long as one or more of these are provided.

C. Other Embodiments (C-1) In the above embodiments, the cavity 117 of the stacked body 450 is formed by cutting. In contrast, the cavity 117 may be formed not by the cutting but by stacking layers around the cavity 117. That is, the cavity 117 may be formed by three-dimensional shaping. In this way, since a cavity 117 having a complicated shape can be easily formed, a degree of freedom in designing the cavity 117 can be increased. In this case, the three-dimensional shaping device 300 may not include the cutting unit 320.

(C-2) In the above-described embodiments, the injection molding device 10 and the three-dimensional shaping device 300 plasticize a material using a flat screw. In contrast, the injection molding device 10 and the three-dimensional shaping device 300 may plasticize the material by using an in-line screw instead of the flat screw.

(C-3) In the above-described embodiments, as the three-dimensional shaping device 300, a device using various three-dimensional shaping methods such as a fused deposition modeling method, a powder sintering lamination shaping method, a stereolithography method, and an inkjet method can be used.

(C-4) In the above-described embodiments, the through holes 431 formed in the base plate 430 may be omitted except for the through holes 431 into which the ejector pin 408 is inserted. Further, a concave portion may be formed instead of the through hole in a portion other than the through holes 431 into which the ejector pin 408 is inserted.

(C-5) In the above-described embodiments, a shape of the base plate 430 is a shape which exactly fits into the opening 441 of the mold base 440. However, the shape of the base plate 430 may be smaller than that of the opening 441. In this case, the stacked body 450 is positioned by fixing the base plate 430 to the mold base 440 with a bolt and the like.

(C-6) In the above-described embodiments, both the fixed mold 410 and the movable mold 420 are resin molds including the stacked body 450. Alternatively, one of the fixed mold 410 and the movable mold 420 may be a metal mold.

(C-7) In the above-described embodiments, in the first step, the cutting is performed after the layers are stacked, and the stacked body 450 having the cavity 117 is shaped. In contrast, a stacked body 450 having a cavity 117 of a different shape may be newly formed by cutting the stacked body 450 having the cavity 117 after being used as the mold 400. In this case, the stacking of the layers in the first step can be omitted, and the mold 400 can be effectively reused.

D. Other Aspects

The present disclosure is not limited to the above-described embodiments, and can be implemented by various configurations without departing from the gist of the present disclosure. For example, in order to solve some or all of problems described above, or to achieve some or all of effects described above, technical characteristics in the embodiments corresponding to technical characteristics in aspects to be described below can be replaced or combined as appropriate. Further, the technical characteristics can be deleted as appropriate unless the technical characteristics are described as essential in the present specification.

(1) According to a first aspect of the present disclosure, a method for manufacturing a mold used in an injection molding device is provided. The manufacturing method includes: a first step of shaping a stacked body as a part of the mold by discharging a shaping material to stack layers on a base plate; and a second step of manufacturing the mold including a mold base, the base plate, and the stacked body by incorporating the base plate on which the stacked body is shaped inside an opening provided in the mold base.

According to such an aspect, since the stacked body is directly shaped on the base plate to be incorporated into the mold base, processing on the attachment surface of the stacked body to the base plate or the mold base is unnecessary. Therefore, the mold including the stacked body can be easily manufactured.

(2) In the above-described aspect, the stacked body shaped in the first step may have a cavity.

(3) In the above-described aspect, in the first step, the stacked body having the cavity may be shaped by cutting after the layers are stacked. According to such an aspect, the cavity can be formed with high accuracy.

(4) In the above-described aspect, the base plate on which the stacked body is shaped in the first step may be provided with a plurality of concave portions or a plurality of through holes in a surface on which the layers are stacked. According to such an aspect, it is possible to prevent peeling of the stacked body from the base plate.

(5) In the above-described aspect, the base plate may have a plurality of through holes in a surface on which the layers are stacked, and the stacked body shaped in the first step may be formed with a communication hole communicating at least one through hole of the plurality of through holes with the cavity formed in the stacked body. According to such an aspect, an ejector pin for demolding a molded object can be inserted into the cavity through the through holes and the communication hole.

(6) In the above-described aspect, the base plate on which the stacked body is shaped in the first step may have a shape that fits into the opening of the mold base. According to such an aspect, the stacked body can be accurately positioned with respect to the mold base.

(7) In the above-described aspect, in the first step, the stacked body shaped in the first step may be formed with a flow path through which a heat medium is to flow. According to such an aspect, the cavity formed in the stacked body can be efficiently cooled.

(8) In the above-described aspect, the stacked body shaped in the first step may be formed with a space in which a sensor is to be attached. According to such an aspect, a temperature and pressure inside the cavity can be monitored using the sensor.

(9) In the above-described aspect, the shaping material used in the first step for shaping the stacked body may have a resin as a main component. According to such an aspect, by heat insulating effect of the resin, it is possible to prevent rapid cooling of the plasticizing material in the cavity at a time of injection molding. Therefore, it is possible to reduce occurrence of sink marks in the molded object.

(10) In the above-described aspect, in the second step, the mold base, into which the base plate on which the stacked body is shaped is incorporated in the second step, may be provided with a metal gate portion. According to such an aspect, it is possible to prevent occurrence of deformation in the gate portion exposed to a high temperature and high pressure in the mold.

(11) According to a second aspect of the present disclosure, a mold used in an injection molding device is provided. The mold includes: a mold base having an opening; a base plate disposed inside the opening of the mold base; and a stacked body shaped on the base plate.

What is claimed is:

1. A method for manufacturing a mold used in an injection molding device, the method for manufacturing a mold comprising:
   a first step of shaping a stacked body as a part of the mold by discharging a shaping material from a three-dimensional shaping device to stack layers on a base plate having a plurality of through holes, wherein communication holes communicating with at least one of the through holes are formed in the stacked body after the layers are stacked; and
   a second step of manufacturing the mold to include a mold base, the base plate, and the stacked body by incorporating the base plate on which the stacked body is shaped inside an opening provided in the mold base.

2. The method for manufacturing a mold according to claim 1, wherein
   the stacked body shaped in the first step has a cavity.

3. The method for manufacturing a mold according to claim 2, wherein
   in the first step, the stacked body having the cavity is shaped by cutting after the layers are stacked.

4. The method for manufacturing a mold according to claim 2, wherein
   the plurality of through holes are defined in a surface on which the layers are stacked, and
   the stacked body shaped in the first step is formed with the communication holes communicating with the at least one through hole through the cavity.

5. The method for manufacturing a mold according to claim 1, wherein
   the base plate on which the stacked body is shaped in the first step is further provided with a concave portion in a surface on which the layers are stacked.

6. The method for manufacturing a mold according to claim 1, wherein
   the base plate on which the stacked body is shaped in the first step has a shape that fits into the opening of the mold base.

7. The method for manufacturing a mold according to claim 1, wherein
   the shaping material used in the first step for shaping the stacked body has a resin as a main component.

8. The method for manufacturing a mold according to claim 1, wherein a part of the shaping material enters the through holes, the through holes in turn exerting an anchoring effect to the stacked body.

9. The method for manufacturing a mold according to claim 1, wherein the mold is configured to be attached to the injection molding device such that an ejector pin is inserted into the communication holes.

* * * * *